(12) United States Patent
Au et al.

(10) Patent No.: US 10,505,842 B2
(45) Date of Patent: Dec. 10, 2019

(54) SYSTEMS AND METHODS FOR SOFTWARE CONFIGURABLE AIR INTERFACE ADAPTATION

(71) Applicant: Huawei Technologies Co., Ltd., Shenzhen (CN)

(72) Inventors: Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 14/941,380

(22) Filed: Nov. 13, 2015

(65) Prior Publication Data

US 2016/0142292 A1    May 19, 2016

Related U.S. Application Data

(60) Provisional application No. 62/079,982, filed on Nov. 14, 2014.

(51) Int. Cl.
*H04L 12/28* (2006.01)
*H04L 12/721* (2013.01)
(Continued)

(52) U.S. Cl.
CPC ............ *H04L 45/38* (2013.01); *H04L 1/0025* (2013.01); *H04L 5/0007* (2013.01);
(Continued)

(58) Field of Classification Search
CPC ...................................................... H04L 12/66
(Continued)

(56) References Cited

U.S. PATENT DOCUMENTS

| 6,954,634 B1 | 10/2005 | Bucknell et al. |
| 7,197,569 B2 | 3/2007 | Dowling |

(Continued)

FOREIGN PATENT DOCUMENTS

| CN | 1315120 A | 9/2001 |
| CN | 101299744 A | 11/2008 |
| WO | 2014008853 A1 | 1/2014 |

OTHER PUBLICATIONS

4G Americas. "4G Americas' Recommendations on 5G Requirements and Solutions" Oct. 24, 2014, Retrieved from <http://www.slideshare.netfzahidtg/4-g-americas-recommendations-on-5g-requirements-and-solutions-10-14-2014finalx?from_action=save> entire document.

(Continued)

*Primary Examiner* — Dang T Ton
(74) *Attorney, Agent, or Firm* — Slater Matsil, LLP

(57) ABSTRACT

A base station may update a SoftAI profile to obtain an updated SoftAI profile specifying a new air interface configuration that was unknown to the base station prior to updating the SoftAI profile. The base station may receive SoftAI configuration information from a network controller, and update the SoftAI profile based on the SoftAI configuration information. The updated SoftAI profile may define a new combination of physical layer parameters, a new waveform, a new modulation coding scheme (MCS), or any other AI configuration parameter, or collection of AI configuration parameters. The SoftAI configuration information, or a separate network instruction, may also specify one or more conditions for using the new air interface configuration to communicate traffic over a wireless link between the base station and a wireless device.

38 Claims, 14 Drawing Sheets

(51) Int. Cl.
  *H04W 4/50* (2018.01)
  *H04L 5/00* (2006.01)
  *H04L 29/08* (2006.01)
  *H04L 1/00* (2006.01)
  *H04W 76/22* (2018.01)
  *H04L 27/00* (2006.01)
  *H04W 24/02* (2009.01)

(52) U.S. Cl.
  CPC ............ *H04L 67/303* (2013.01); *H04W 4/50* (2018.02); *H04L 5/0092* (2013.01); *H04L 27/0008* (2013.01); *H04W 24/02* (2013.01); *H04W 76/22* (2018.02)

(58) Field of Classification Search
  USPC ......................................................... 370/352
  See application file for complete search history.

(56) References Cited

U.S. PATENT DOCUMENTS

| | | | | |
|---|---|---|---|---|
| 7,634,269 | B2* | 12/2009 | Gallagher | ............. H04W 16/16 370/331 |
| 2005/0130662 | A1 | 6/2005 | Murai | |
| 2005/0250468 | A1 | 11/2005 | Lu et al. | |
| 2007/0260710 | A1 | 11/2007 | Dowling | |
| 2008/0176518 | A1 | 7/2008 | Pascht et al. | |
| 2008/0225965 | A1* | 9/2008 | Pi | ......................... H04L 1/0003 375/260 |
| 2009/0034438 | A1 | 2/2009 | Soulie et al. | |
| 2014/0016570 | A1 | 1/2014 | Ma et al. | |
| 2017/0208455 | A1* | 7/2017 | Au | ........................ H04W 76/10 |

OTHER PUBLICATIONS

Petar Popovski et al., Deliverable D2.1 Requirement Analysis and Design Approaches for 5G Air Interface, Document No. ICT-317669-METIS/D2.1, Project Name: Mobile and wireless communications Enablers for the Twenty-twenty Information Society (METIS), Aug. 30, 2013, XP055248882, URL: https://www.metis2020.com/wp-content/uploads/deliverables/METIS_D2.1_v1.pdf, 72 pages.

Opovski, P., et al., "Novel Radio Link Concepts and State of the Art Analysis," Metis Project, Deliverable D2.2, Oct. 23, 2013, 6 Pages, V1.

Hadzialic, M., et al., "Cloud-RAN: Innovative radio access network architecture", 55th International Symposium, Proceedings ELMAR-2013, Sep. 2013, 7 Pages.

Wu, W., et al., "PRAN: Programmable Radio Access Networks", HotNets-XIII Proceedings of the 13th ACM Workshop on Hot Topics in Networks, Oct. 2014, 7 Pages.

* cited by examiner

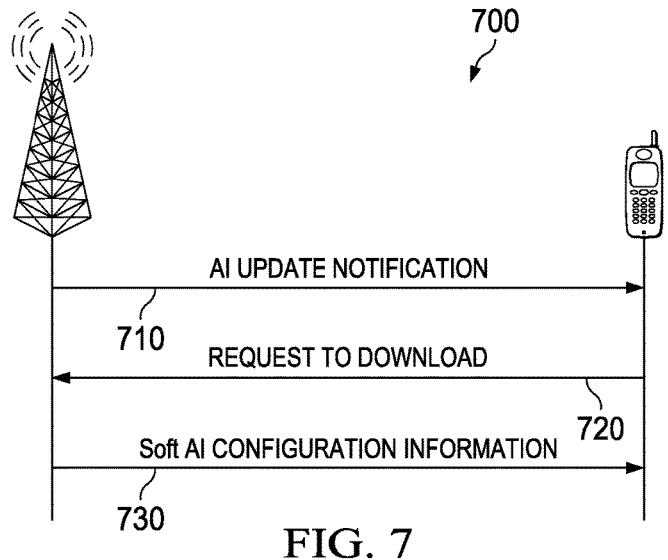
FIG. 7
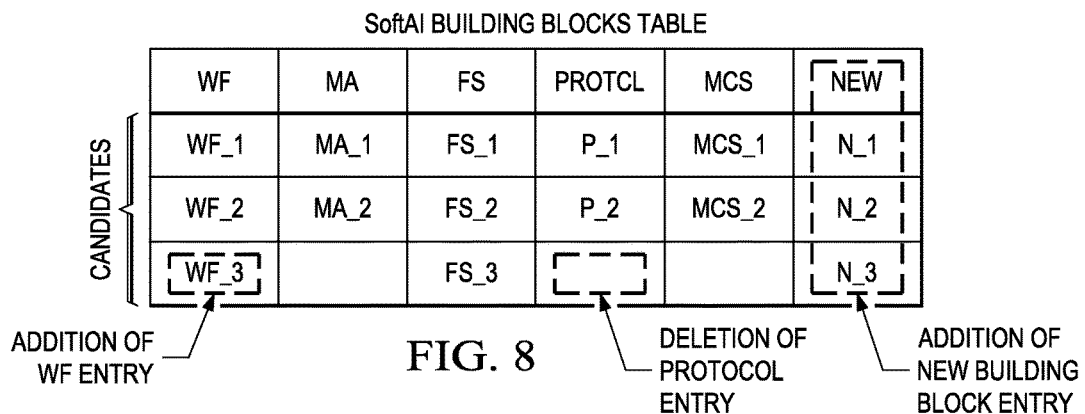
FIG. 8
SoftAI CONFIGURATIONS TABLE
|  | DEFAULT | LTE | CONFIG 1 | CONFIG 2 | CONFIG 3 |
|---|---|---|---|---|---|
| WF | WF_1 | WF_1 |  | WF_2 | WF_3 |
| MA | MA_1 | MA_2 | MA_2 | MA_2 | MA_1 |
| FS | FS_1 | FS_2 | FS_2 | F_3 | FS_2 |
| PROTCL | P_1 | P_2 | P_2 |  | P_1 |
| MCS | MCS_1 | MCS_2 |  |  | MCS_2 |
FIG. 9

US 10,505,842 B2

SYSTEMS AND METHODS FOR SOFTWARE CONFIGURABLE AIR INTERFACE ADAPTATION

This patent application claims priority to U.S. Provisional Application No. 62/079,982, filed on Nov. 14, 2014 and entitled "System and Method for Software Configurable Air Interface Adaptation," which is hereby incorporated by reference herein as if reproduced in its entirety.

TECHNICAL FIELD

The present invention relates to a system and method for wireless communications, and, in particular embodiments, to systems and methods for software configurable air interface adaptation.

BACKGROUND

Next-generation wireless networks will need to support diverse traffic types (e.g., voice, data, mobile-gaming), while providing high throughput rates over various, oftentimes changing, channel conditions. To achieve this, network devices may need to use different air interface configurations to communicate different types of traffic over various, oftentimes changing, channel conditions. Accordingly, techniques for establishing different air interface configurations in an efficient, yet scalable, fashion are desired.

SUMMARY

Technical advantages are generally achieved, by embodiments of this disclosure which describe systems and methods for software configurable air interface adaptation In accordance with an embodiment, a base station updates a software-configurable air interface (SoftAI) profile to obtain an updated SoftAI profile. The updated SoftAI profile defines a new air interface configuration that was unknown to the base station prior to updating the SoftAI profile. An apparatus for performing this method is also provided.

In accordance with yet another embodiment, a base station receives SoftAI configuration information from a network controller. The SoftAI configuration information is used to construct a SoftAI table defining a new air interface configuration that was unknown to the base station prior to receiving the SoftAI configuration information from the network controller. In this example, the method further includes communicating a traffic flow to a wireless device in accordance with the new air interface configuration after receiving the SoftAI configuration information from the network controller. An apparatus for performing this method is also provided.

In accordance with yet another embodiment, a method for updating a software-configurable air interface (SoftAI) is provided. In this example, the method includes communicating a first traffic flow between a base station and a wireless device in accordance with a first air interface configuration, and transmitting SoftAI configuration information to the wireless device. The SoftAI configuration information is used to construct a SoftAI profile that defines a second air interface configuration unknown to the wireless device prior to receiving the SoftAI configuration information. The method further includes communicating a second traffic flow in accordance with the second air interface configuration after transmitting the SoftAI configuration information to the wireless device. An apparatus for performing this method is also provided.

In accordance with yet another embodiment, another method for updating a software-configurable air interface (SoftAI) is provided. In this example, the method includes communicating a first traffic flow between a base station and a wireless device in accordance with a first air interface configuration, and receiving SoftAI configuration information from the base station at the wireless device. The SoftAI configuration information is used to construct a SoftAI profile defining a second air interface configuration that was unknown to the wireless device prior to receiving the SoftAI configuration information from the base station. The method further includes communicating a second traffic flow in accordance with the second air interface configuration after transmitting the SoftAI profile to the wireless device. An apparatus for performing this method is also provided.

In accordance with another embodiment, yet another method for updating a software-configurable air interface (SoftAI) is provided. In this example, the method includes communicating a first traffic flow between a base station and a first wireless device in accordance with a first air interface configuration, and receiving SoftAI configuration information from a network controller. The SoftAI configuration information is used to construct a SoftAI profile defining a second air interface configuration that was unknown to the base station prior to receiving the SoftAI configuration information from the network controller. The method further includes communicating a second traffic flow in accordance with the second air interface configuration after receiving the SoftAI configuration information from the network controller. The second traffic flow be communicated between the base station and either the first wireless device or a second wireless device. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates a protocol diagram of an embodiment communications sequence for notifying a wireless device of a new air interface configuration;

FIG. 8 illustrates a diagram of an embodiment SoftAI building blocks table;

FIG. 9 illustrates a diagram of an embodiment SoftAI configurations table;

DETAILED DESCRIPTION OF ILLUSTRATIVE EMBODIMENTS

Figure 1:
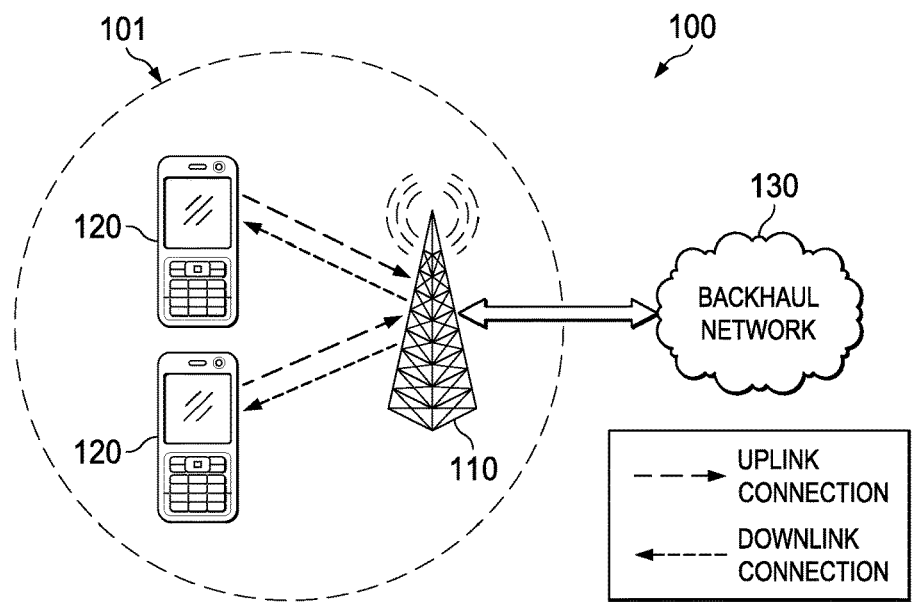
FIG. 1 illustrates a diagram of an embodiment wireless communications network.

The structure, manufacture and use of embodiments are discussed in detail below. It should be appreciated, however, that this disclosure provides many applicable inventive concepts that can be embodied in a wide variety of specific contexts. The specific embodiments discussed herein are merely illustrative of specific examples of the inventive aspects, and do not limit the scope of the claims.

The subset of parameters used to configure an air interface are collectively referred to as the "air interface configuration," and may include physical layer parameters (e.g., transmission time interval (TTI) interval, cyclic prefix (CP) duration, sub-carrier (SC) spacing, symbol duration, etc.), a waveform, one or more transmission modes, one or more access schemes, a re-transmission scheme, or a combination thereof. It should be noted that other terminologies other than "configuration" may be used to describe such a collection of air interface parameters: "profile", "category". In some embodiments, an air interface configuration specifies different access techniques for different sets of resources. For example, the air interface configuration may specify that some resources are accessed via contention-based access while other resources are accessed via scheduling-based access.

Embodiments of this disclosure enable a base station to update a SoftAI profile such that the updated SoftAI profile specifies a new air interface configuration that was unknown to the base station prior to updating the SoftAI profile. In some embodiments, the base station receives software-configurable air interface (SoftAI) configuration information from a network controller, and updates the SoftAI profile based on the SoftAI configuration information. In such embodiments, the new air interface configuration may have been unknown to the base station prior to receiving the SoftAI configuration information. The SoftAI configuration information may include an index, a table, and/or an instruction. An updated SoftAI profile may be stored in various formats, such as in one or more SoftAI tables. In one embodiment, the SoftAI configuration information defines the updated SoftAI profile in its entirety. In another embodiment, the SoftAI configuration information modifies an existing SoftAI profile to form the new SoftAI profile. The updated SoftAI profile may define a new combination of physical layer parameters, a new waveform, a new modulation coding scheme (MCS), or any other AI configuration parameter, or collection of AI configuration parameters. In an embodiment, the updated SoftAI profile defines one or more orthogonal frequency division multiplexed (OFDM) based waveform parameters, such as a transmission time interval (TTI) length, a cyclic-prefix length, a sub-carrier spacing, and/or a symbol duration of an OFDM-based waveform. In another embodiment, the updated SoftAI profile defines one or more AI configuration parameters, such as a new modulation coding scheme (MCS), a new re-transmission protocol, a new forward error correction (FEC) protocol, and/or a new multiple access scheme. The SoftAI configuration information, or a separate network instruction, may also specify one or more conditions for using the new air interface configuration to communicate traffic over a wireless link between the base station and a wireless device, such as when a characteristic of the wireless device, a characteristic of the wireless link, or a traffic characteristic satisfies one or more criteria. These and other inventive aspects are described in greater detail below.

Figure 2A:
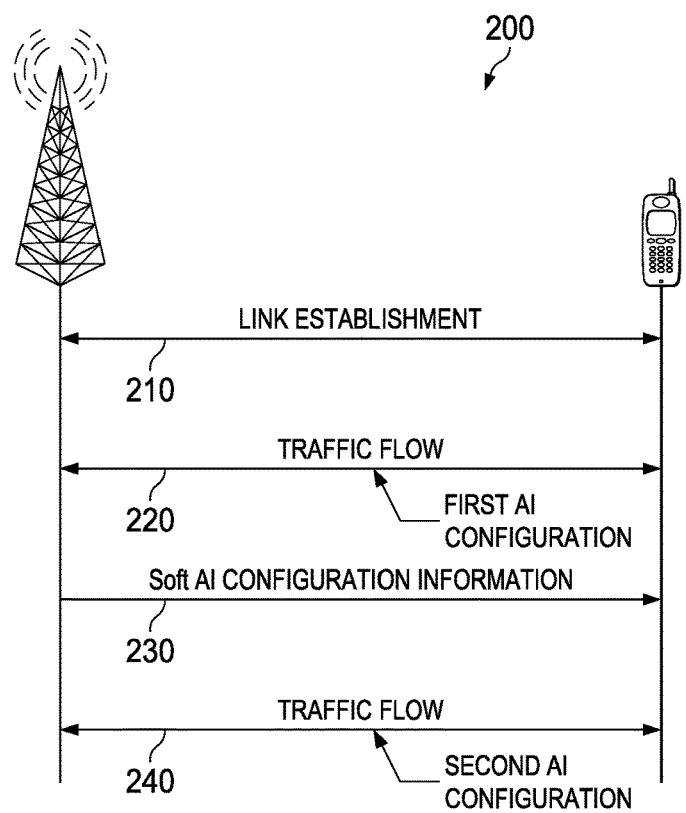
FIG. 2A illustrates a protocol diagram of an embodiment communications sequence for configuring an air interface.

Embodiments of this disclosure communicate software-configurable air interface (SoftAI) configuration information to wireless devices in order to notify the wireless devices of new air interface configurations. A network device may maintain a "master" SoftAI profile containing air interface configurations supported in the system. FIG. 2A illustrates an embodiment communication sequence 200 for establishing an air interface configuration between a network device and a wireless device. As shown, the embodiment communication sequence 200 begins by communicating link establishment signaling 210 between the network device and the wireless device to establish a wireless link between those devices. The link establishment signaling 210 may include any type of signaling that facilitates establishment of a wireless link, including discovery signaling, signaling for authenticating the wireless device, and/or signaling for authorizing access to the wireless network. Next, a traffic flow 220 is communicated between the network device and the wireless device in accordance with a first air interface configuration. The traffic flow 220 may be communicated from the wireless device to the network device based on the first air interface configuration, or vice-versa. In some embodiments, a SoftAI profile defining the first air interface configuration is included in the link establishment signaling 210. In other embodiments, the first air interface configuration is a priori information to the wireless device.

Thereafter, the network device communicates SoftAI configuration information 230 to the wireless device. The SoftAI configuration information 230 can be communicated via higher layer signaling such as Radio Resource Control (RRC). The SoftAI configuration information 230 may define a new SoftAI profile in its entirety. Alternatively, the SoftAI configuration information 230 may modify one or more entries in an existing SoftAI profile to form a new SoftAI profile. The new SoftAI profile defines a second air interface configuration that is different than the first air interface configuration. The second air interface configuration was not known by the wireless device prior to receiving the SoftAI configuration information 230. In an embodiment, the new SoftAI profile defines a new combination of physical layer parameters that were unknown to the wireless device prior to receiving the SoftAI configuration information 230. In such an embodiment, each of the individual physical layer parameters in the new combination of physical layer parameters may have been known by the wireless device prior to receiving the SoftAI configuration information, in which case the wireless device may not have been aware that the individual physical layer parameters could be combined in the manner defined by the SoftAI profile prior to receiving SoftAI configuration information from the base station. Alternatively, in such an embodiment, the SoftAI information may define a new physical layer parameter that was unknown by the wireless device prior to receiving SoftAI configuration information from the base station.

In another embodiment, the new SoftAI profile defines a new waveform (or new parameters of an existing waveform) that was unknown to the wireless device prior to receiving SoftAI configuration information 230. In yet another embodiment, the new SoftAI profile defines a new modulation coding scheme (MCS) that was unknown to the wireless device prior to receiving SoftAI configuration information 230. In yet another embodiment, the new SoftAI profile defines a new multiple access scheme that was unknown to the wireless device prior to receiving the SoftAI configuration information 230. In yet another embodiment, the new SoftAI profile defines a new frame structure that was unknown to the wireless device prior to receiving the SoftAI configuration information 230.

In some embodiments, the first air interface configuration is a default air interface configuration, and the second air interface configuration is dynamically assigned or generated by the network. In some embodiments, the SoftAI configuration information 230, or a separate signaling instruction communicated by the network, instructs the wireless device to communicate the second traffic flow in accordance with the second air interface configuration when a condition is met. In one example, the SoftAI configuration information specifies the condition. In another example, a separate signaling instruction specifies the condition. In yet another example, a separate signaling instruction directly instructs the wireless device to communicate the second traffic flow in accordance with the second air interface configuration. For example, the wireless device may be instructed to communicate the second traffic flow based on the second physical layer configuration when a quality of service (QoS) requirement (e.g., latency, jitter, etc.) of the second traffic flow satisfies one or more criteria, e.g., exceeds a threshold, fails to exceed a threshold, falls within a range, has a specified value, etc. As another example, the wireless device may be instructed to communicate the second traffic flow based on the second physical layer configuration when a packet size associated with the second traffic flow satisfies a criterion. The packet size may be an average or median packet size in the second traffic flow, a smallest packet in the second traffic flow, or a largest packet in the second traffic flow. As yet another example, the wireless device may be instructed to communicate the second traffic flow based on the second physical layer configuration when an amount of data in the second traffic flow satisfies a criterion. As yet another example, the wireless device may be instructed to communicate the second traffic flow based on the second physical layer configuration when a path loss or error rate over the wireless link satisfies a criterion. As yet another example, the wireless device may be instructed to communicate the second traffic flow based on the second physical layer configuration when a mobility speed of the wireless device satisfies a criterion.

Figure 2B:
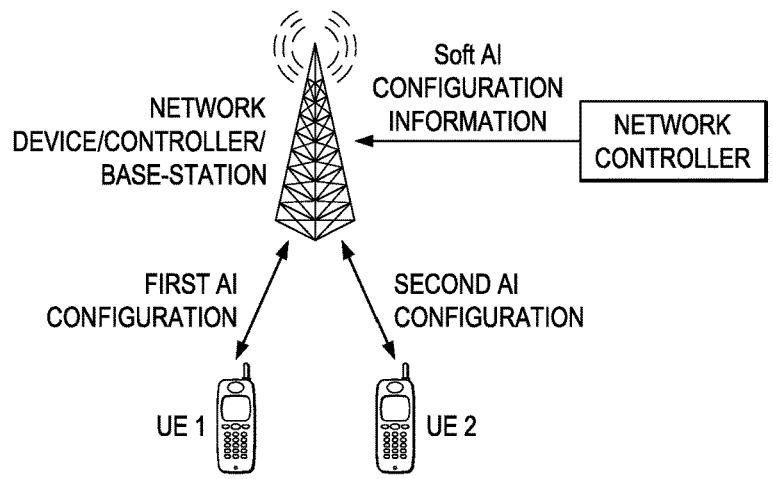
FIG. 2B illustrates an embodiment of a wireless network for supporting new air interface configurations.

In some situations, new AI configurations are known by a wireless device, but not a network device. In such situations, the SoftAI configuration information may be communicated to the network device by a network controller, or even by the wireless device. FIG. 2B illustrates an embodiment wireless network for supporting new air interface configurations. In this example, a network device communicates a first traffic flow in accordance with a first air interface configuration with a first UE. The network device then receives SoftAI configuration information from a network controller. The SoftAI configuration information either defines a new SoftAI profile, or modifies an existing SoftAI profile to create a new Soft AI profile. The new SoftAI profile defines a second air interface configuration that is different than the first air interface configuration. The second air interface configuration was not known by the network device prior to receiving the SoftAI configuration information. After receiving the update, the network device communicates a second traffic flow in accordance with the second air interface configuration. In one embodiment, the second traffic flow is communicated to a second UE that is capable of supporting the second air interface configuration. In such an embodiment, the second air interface configuration may be a priori information to the second UE. Alternatively, the base station may communicate SoftAI configuration to the second UE to inform the second UE of the second air interface configuration prior to communicating the second traffic flow. In another embodiment, the second traffic flow is communicated to the first UE.

Figure 3:
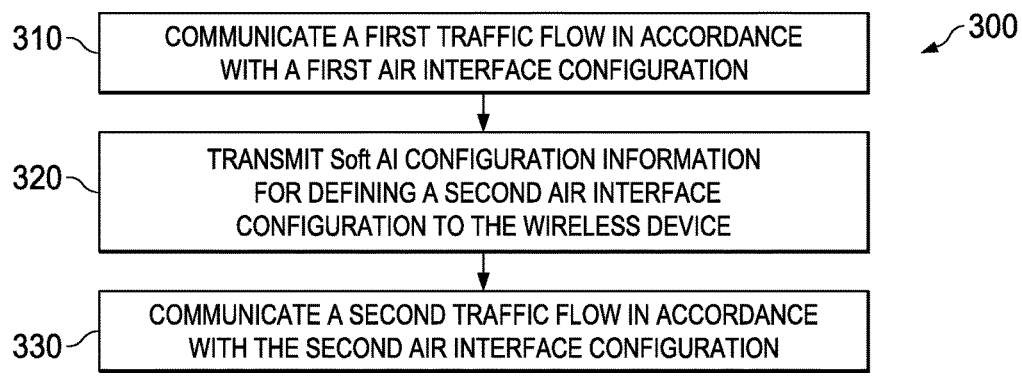
FIG. 3 illustrates a flowchart of an embodiment method for configuring an air interface.

FIG. 3 illustrates a flowchart of an embodiment method 300 for configuring an air interface over a wireless link, as may be performed by a network device. At step 310, the network device communicates a first traffic flow to or from a wireless device in accordance with a first air interface configuration. The first traffic flow may be transmitted from the network device to the wireless device based on the first air interface configuration. Alternatively, the network device may receive the first traffic flow from the wireless device based on the first air interface configuration.

At step 320, the network device transmits SoftAI configuration information to the wireless device. The SoftAI configuration information may specify a new SoftAI profile in its entirety, e.g., all rows and columns. Alternatively, the SoftAI configuration information may modify an existing SoftAI profile to form a new SoftAI profile. The new SoftAI profile defines a second air interface configuration that was unknown to the wireless device prior to receiving the SoftAI configuration information. At step 330, the network device communicates a second traffic flow in accordance with the second air interface configuration. The first traffic flow and the second traffic flow may be communicated over the same wireless link, or over different wireless links. It should be appreciated that the step of communicating a traffic flow based on an air interface configuration may also include the transmission and/or reception of feedback information (e.g., hybrid automatic repeat requests (HARQ) signaling, TCP acknowledgement (ACK) messages) associated with the traffic flow according to a re-transmission scheme associated with the air interface configuration.

Figure 4:
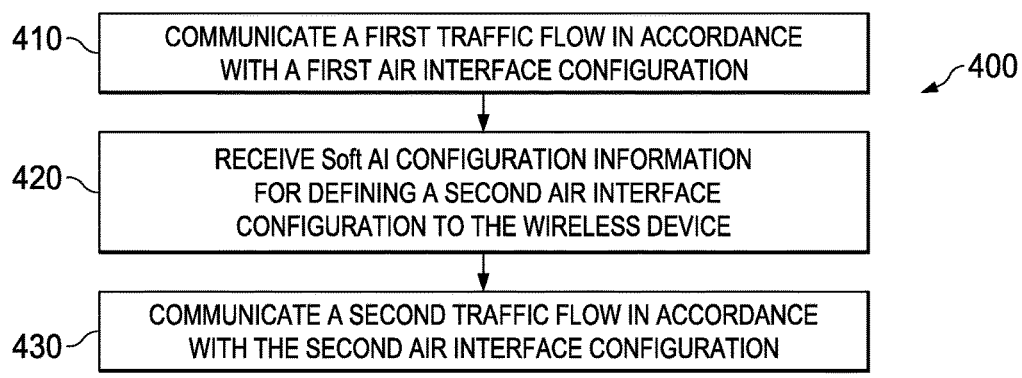
FIG. 4 illustrates a flowchart of another embodiment method for configuring an air interface.

FIG. 4 illustrates a flowchart of an embodiment method 400 for configuring an air interface over a wireless link, as may be performed by a wireless device. At step 410, the wireless device communicates a first traffic flow in accordance with a first air interface configuration. The first traffic flow may be communicated from the wireless device to the network device, or vice versa.

At step 420, the wireless device receives SoftAI configuration information from the network device. The SoftAI configuration information may specify a new SoftAI profile in its entirety, or modify an existing SoftAI profile to form a new SoftAI profile. The new SoftAI profile defines a second air interface configuration that was unknown to the wireless device prior to receiving the SoftAI configuration information. At step 430, the wireless device communicates a second traffic flow in accordance with the second air interface configuration. The first traffic flow and the second traffic flow may be communicated over the same wireless link, or over different wireless links.

Although aspects of this disclosure discuss a SoftAI configuration information primarily in the context of being communicated from a base station to a wireless device and/or from a network controller to a base station, it should be appreciated that the inventive aspects described herein may be used to communicate SoftAI configuration information between any wirelessly-enabled devices. For example, the SoftAI configuration information may be communicated between wireless devices engaged in device-to-device communications. SoftAI configuration information may also be used to establish a new air interface configuration over a mesh backhaul link between two network devices.

Embodiments described herein provide SoftAI update and adaptation mechanisms that may allow for forward compatibility of fifth generation (5G) air interfaces. Different SoftAI configurations may be used for different wireless scenarios and/or different network (NW) and user equipment (UE) capabilities.

Figure 5:
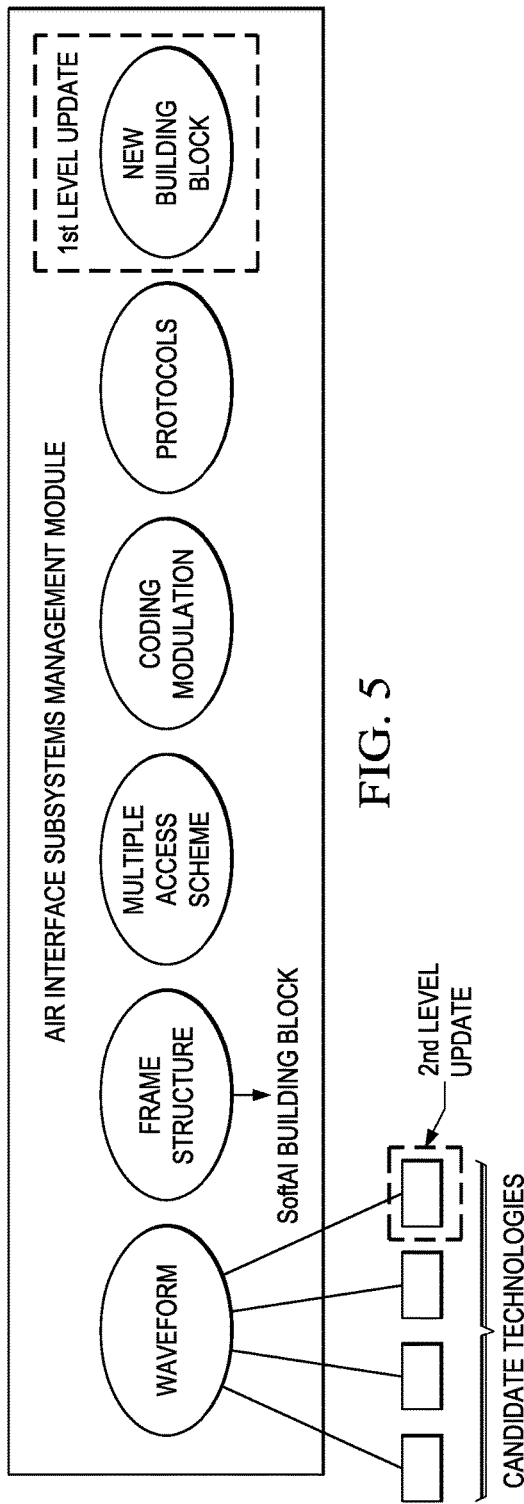
FIG. 5 illustrates a diagram of an embodiment air interface subsystems management module.

FIG. 5 illustrates an embodiment air interface subsystems management module. Update mechanisms may include first level mechanisms and second level mechanisms, as well as allow for the updating of SoftAI configurations. The first level mechanisms update SoftAI building blocks (e.g., addition and/or deletion). The second level mechanisms update candidate technologies in corresponding building blocks. The update of SoftAI configurations (e.g., addition and/or deletion) may include the construction of new SoftAI configurations from selected candidates in building blocks, as well as the maintenance of SoftAI configurations at the network and/or UE.

Figure 6:
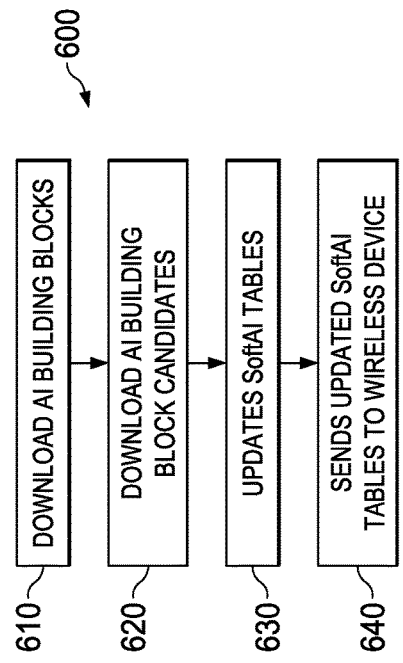
FIG. 6 illustrates a flowchart of an embodiment method for notifying a wireless device of a new air interface configuration.

FIG. 6 illustrates a method 600 for notifying a wireless device of a new air interface configuration, as might be performed by a network device. At step 610, the network device downloads AI building blocks. Step 610 may be excluded from some embodiment methods, such as in cases where the new air interface configuration uses building blocks known by network device, e.g., the building blocks do not change. At step 620, the network device downloads AI building block candidates. At step 630, the network device updates one or more SoftAI profiles based on the AI building block candidates. This may include building a new SoftAI profile that defines a new AI configuration. At step 640, the network device sends updated SoftAI profiles to a wireless device.

FIG. 7 illustrates a communications sequence 700 for notifying a wireless device of a new air interface configuration. As shown, a network device sends an AI update notification to the wireless device indicating that an updated air interface configuration is available. The wireless device then sends a request 720 to the network device for downloading the updated air interface configuration. The network device then sends a SoftAI profile 730 to the device. The SoftAI profile 730 defines the new air interface configuration.

New air interface building blocks can be downloaded via a software update at the network entity. New candidates of air interface building blocks can also be downloaded. The subsystem management profiles may then be updated with new building blocks and candidates of corresponding building blocks. The new candidates can then be sent from the network device to a wireless device. In some implementations, only second level update procedures are required if there is no need to change the building blocks. FIG. 8 illustrates an embodiment SoftAI building blocks table. FIG. 9 illustrates an embodiment SoftAI configuration table. Each table is constructed in such a way that new entries and fields can be added easily. An example method is using type-length-value (TLV) mechanism to construct the table.

The SoftAI building blocks table contains entries of candidate technologies for each building block. Each entry may be a name, label or an index corresponding to a candidate technology. In FIG. 8, an example is given for a SoftAI building blocks table that contains: waveform (WF), multiple access (MA), frame structure (FS), protocol (Protcl), modulation and coding scheme (MCS), and potentially new building blocks. Under each building block, candidate technologies are identified by a name, label or index. For example, waveform building block contains three candidates: WF_1, WF_2 and WF_3 corresponding to three different candidate waveforms. In another embodiment, the waveform building block contains different candidates of waveform parameters for a particular waveform. For example, an OFDM-based waveform (e.g. filtered-OFDM or f-OFDM in short) may be the fundamental waveform for all air interface configurations. In that case, WF_1 may represent a first set of waveform parameters consisting of a first cyclic-prefix length, a first sub-carrier spacing etc. WF_2 may represent a second set of waveform parameters consisting of a second cyclic-prefix length, a second sub-carrier spacing etc. In yet another embodiment, the waveform building block contains candidates representing a combination of waveform and waveform parameters. In that case, WF_1 may represent a first waveform and a corresponding first set of waveform parameters. WF_2 may represent a first waveform and a corresponding second set of waveform parameters. WF_3 may represent a second waveform and a third waveform parameters etc. The multiple access building block may contain two candidates: MA_1 and MA_2 indicating scheduled-based and grant-free multiple access scheme respectively. In another embodiment, MA_1 may indicate a combination of scheduled-based and grant-free multiple access schemes while MA_2 may indicate either a scheduled-based or grant-free multiple access scheme. The frame structure building block may contain multiple candidates conveying different combination of parameters such as time division duplex (TDD) or frequency division duplex (FDD) mode, transmission time interval (TTI) lengths, subframe lengths, TDD subframe and/or TTI types representing different uplink/downlink transmission switching etc.

The SoftAI configurations table in FIG. 9 contains different configurations, which contain different sets of candidate technology in building block(s). The table may contain a default AI configuration. The table may contain a backward compatible configuration (e.g., Long Term Evolution (LTE)). Additional configurations may specify only the changes from the default.

The formation of a new SoftAI configuration may be based on new traffic types and quality of service (QoS) requirments, new and existing candidates of building block(s), new scenarios, and the like. A SoftAI configuration module may select components to form a new SoftAI configuration. The components may be from new or existing components. The SoftAI configuration table may be updated with the new entry. The updated information (e.g., configuration number, component numbers) may be signaled to wireless devices.

For a specific application scenario (vertical), a predefined and customized SoftAI configuration may be applied. Mechanisms for customized SoftAI configuration include input parameters for a particular scenario such as spectrum/ frequency band, network and device capabilities, traffic characteristics (e.g., latency requirement, packet size), mobility information, and an expected number of supported devices.

The formation of a predefined SoftAI configuration is based on the input requirements. All or a subset of AI building blocks can constitute a SoftAI configuration. Based on a supported application scenario at deployment, the SoftAI configuration module selects the corresponding SoftAI configuration. Radio resources for the predefined SoftAI configuration are allocated.

Figure 10:
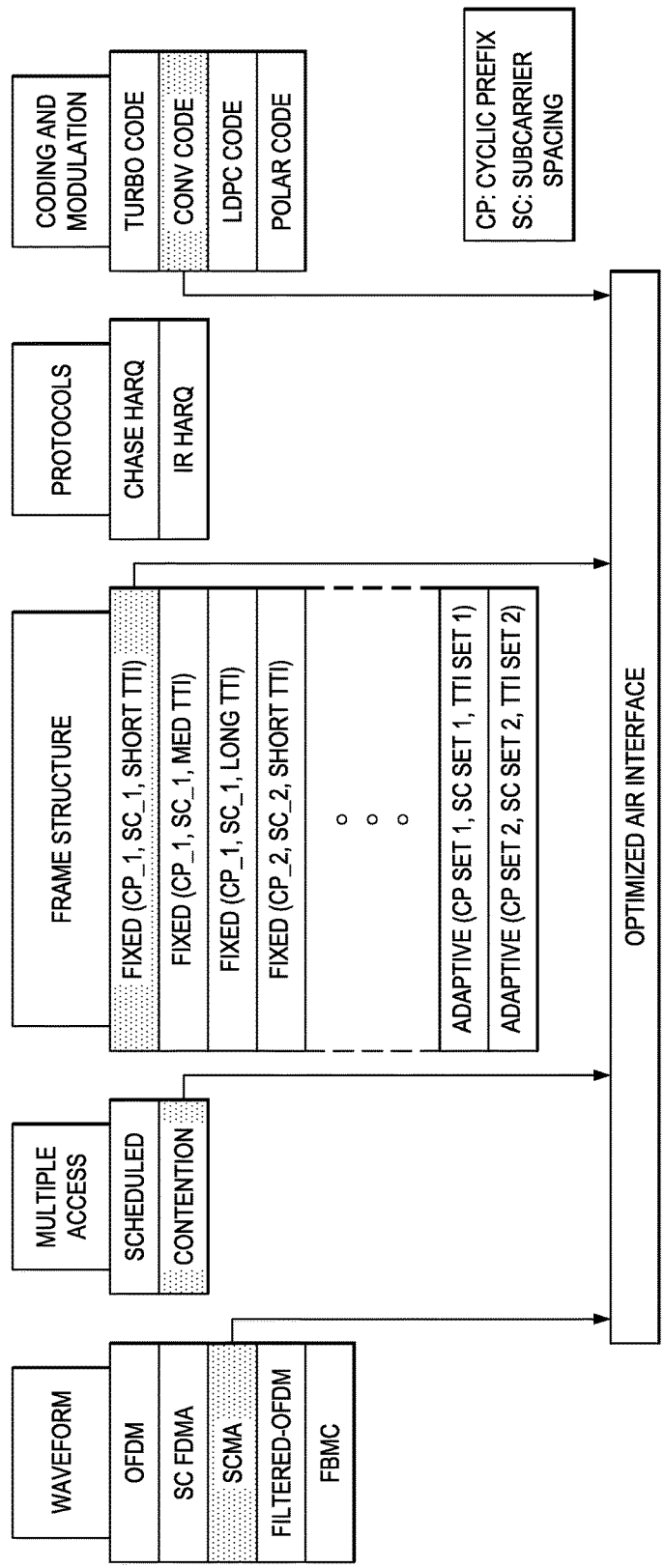
FIG. 10 illustrates a diagram of an embodiment air interface configuration.
Figure 11:
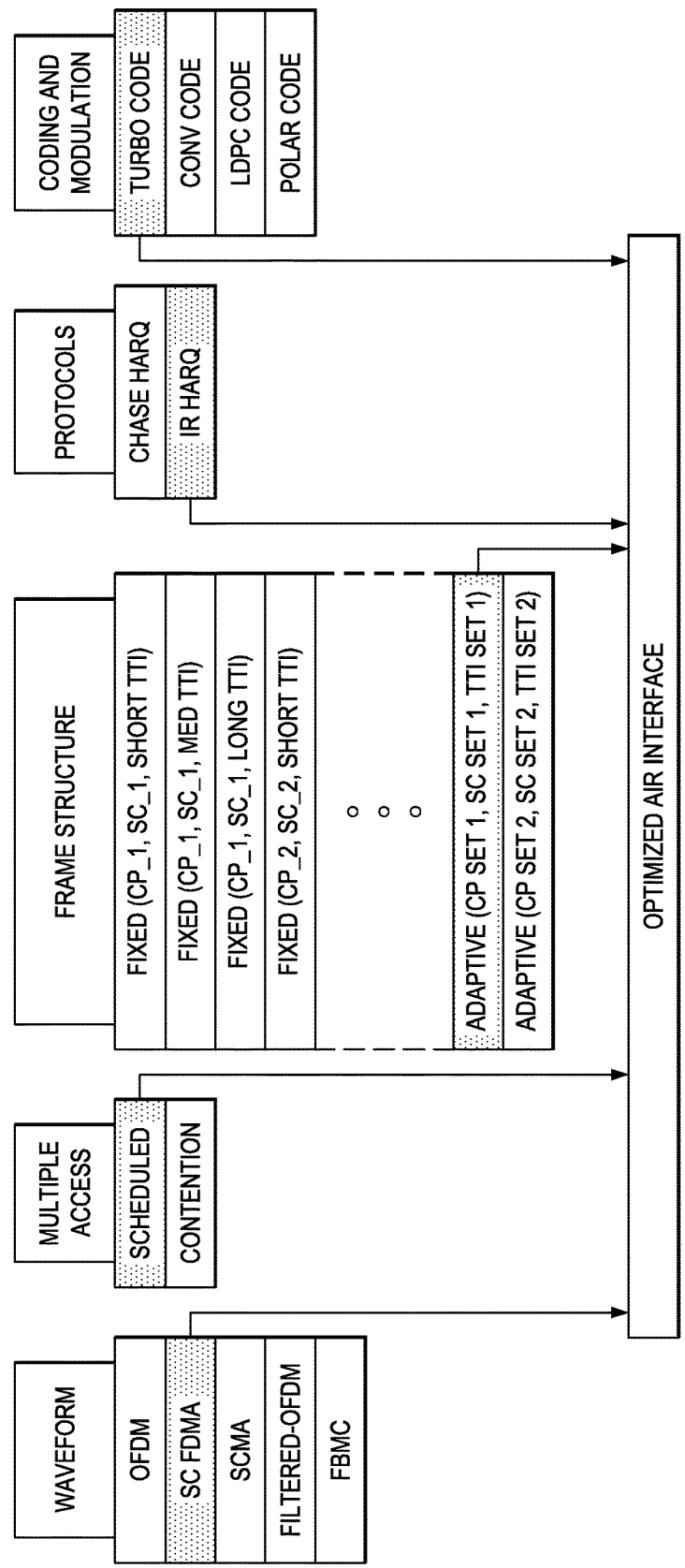
FIG. 11 illustrates a diagram of another embodiment air interface configuration.
Figure 12:
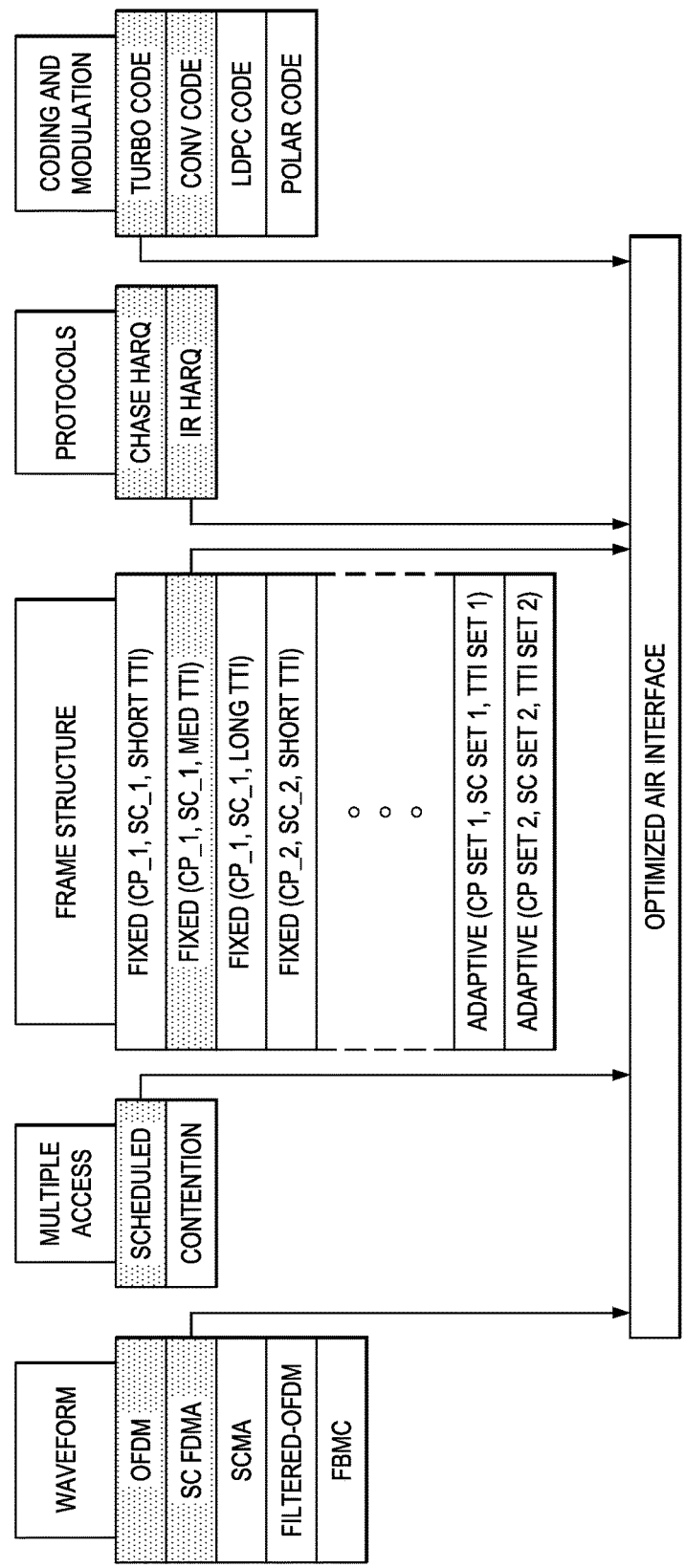
FIG. 12 illustrates a diagram of yet another embodiment air interface configuration.

The devices and/or network supporting a particular scenario may be configured to store only one or a subset of the customized SoftAI configurations (e.g., deletion of other SoftAI configurations). Low-cost transmit nodes and devices may only be able to support a subset of AI configurations. FIG. 10 illustrates an embodiment air interface configuration for a machine type communication (MTC) application. FIG. 11 illustrates an embodiment air interface configuration for a millimeter wave (mmW) application. FIG. 12 illustrates an embodiment air interface configuration that is backwards compatible with a fourth generation (4G) Long Term Evolution (LTE) radio access network.

Components in SoftAI can be changed in a semi-static/dynamic manner. This is applicable for scenarios such as content-aware configurations, intelligent spectrum utilization, and the like. Mechanisms for semi-static/dynamic SoftAI configuration may include continuous or semi-static monitoring of input parameters, such as contents/applications (e.g., traffic types, QoS requirements), spectrum/frequency bands, mobility information, and/or the number of devices in the system.

Figure 13A:
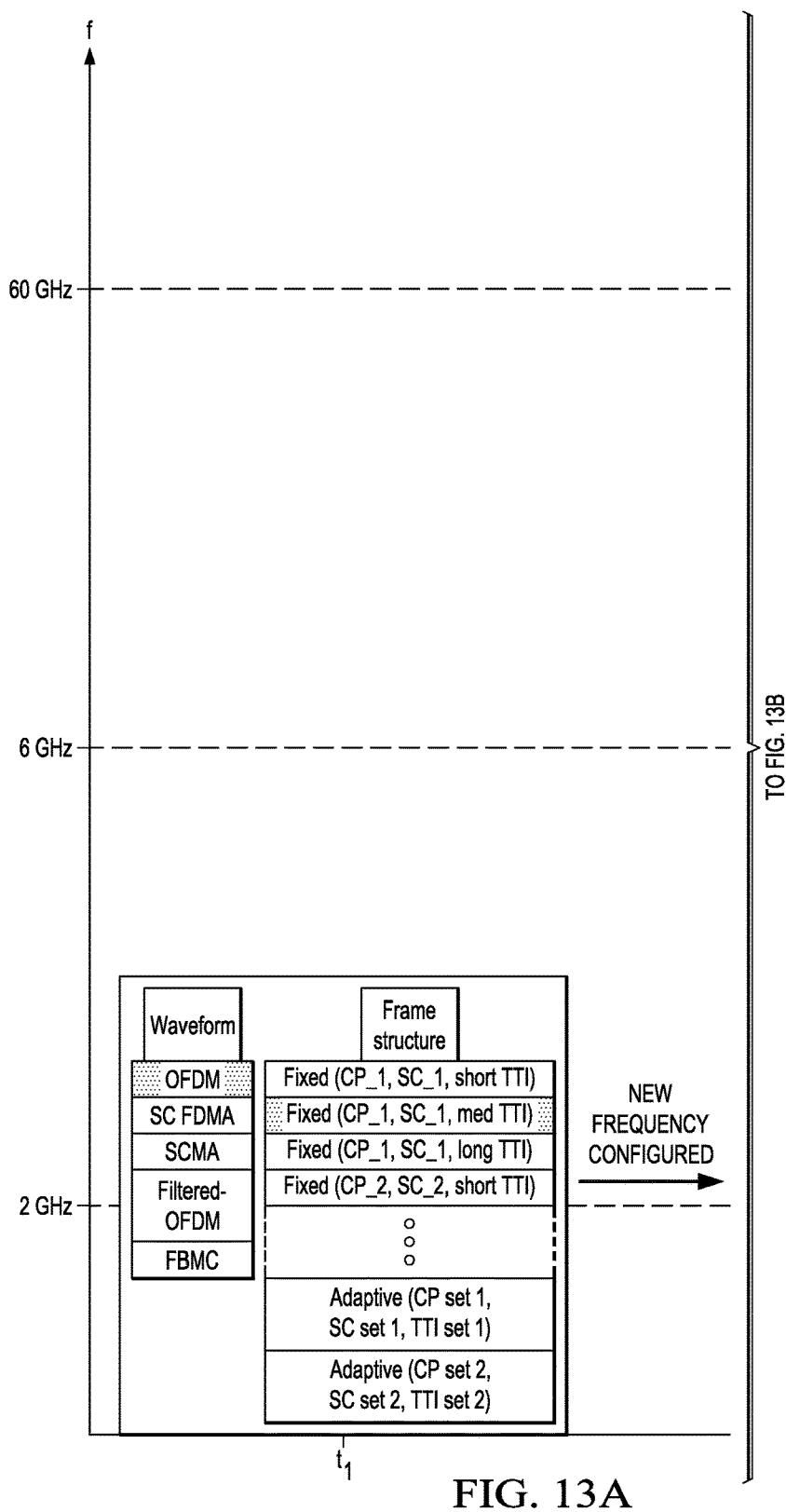
FIGS. 13A and 13B illustrate a diagram of an embodiment spectrum adapted for intelligent spectrum utilization.
Figure 13B:
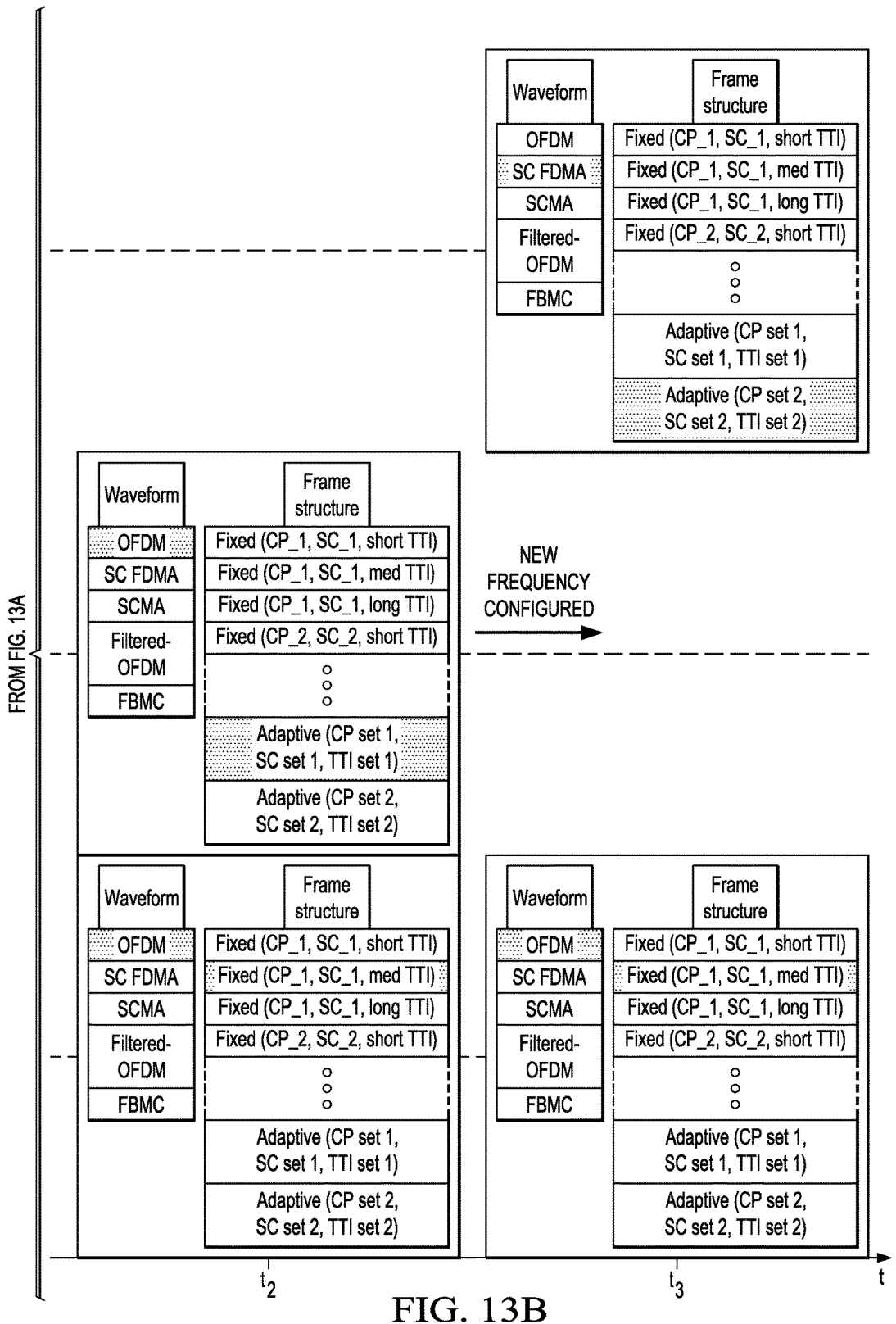
Figure 14A:
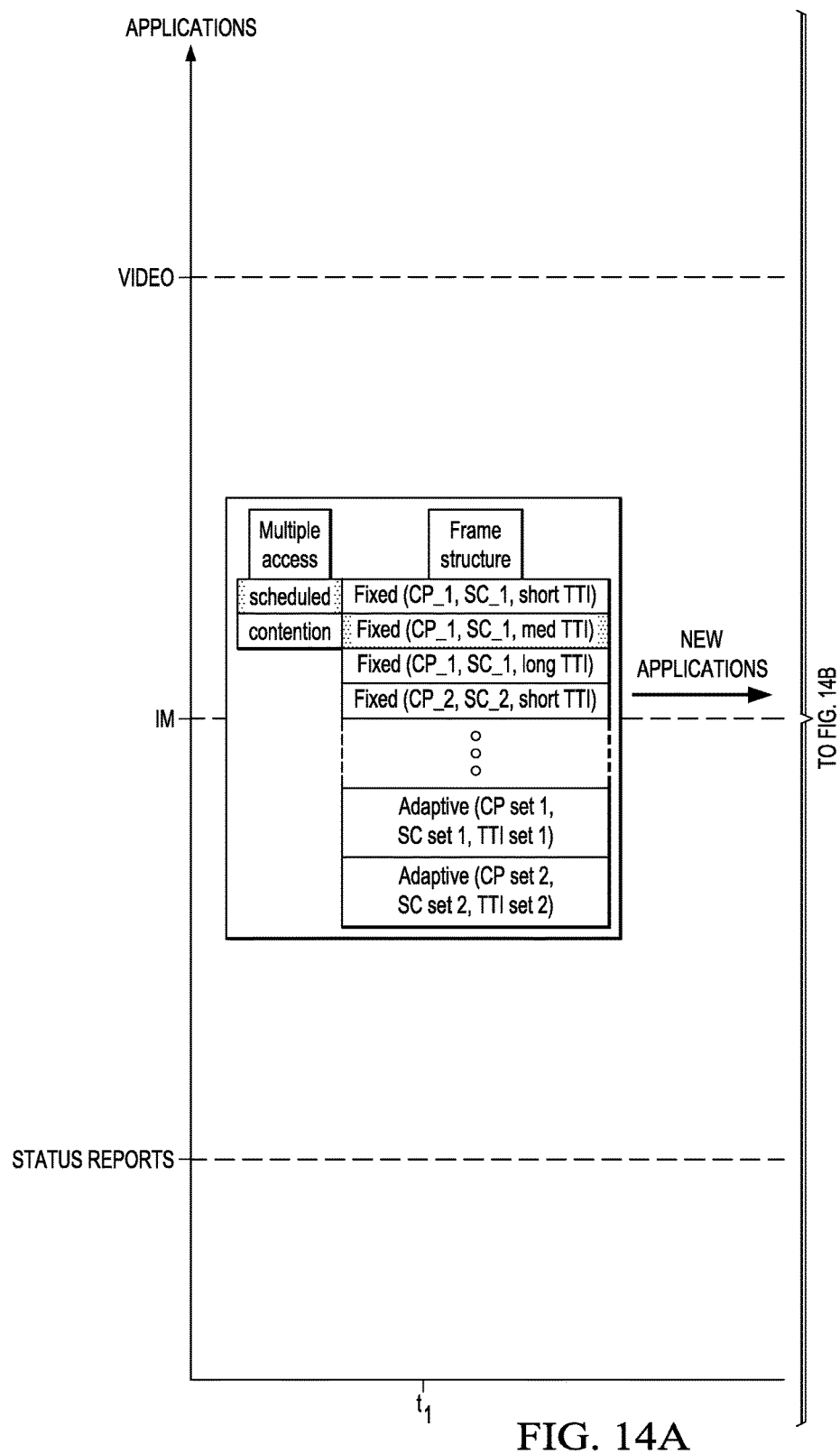
FIGS. 14A and 14B illustrate a diagram of an embodiment spectrum adapted for intelligent spectrum utilization.
Figure 14B:
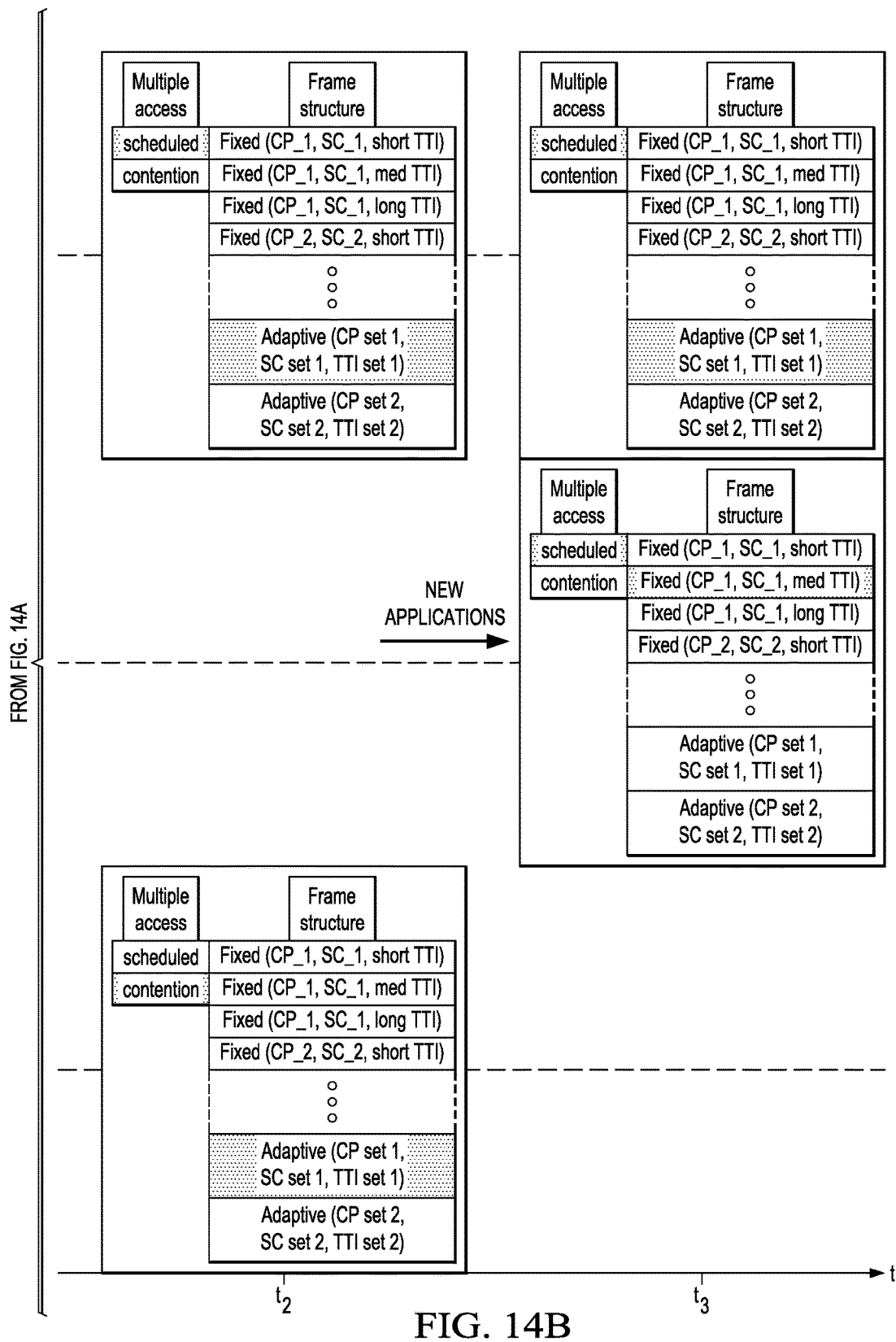

Based on input parameters, the SoftAI configuration module may semi-statically/dynamically select the appropriate candidate technology in a SoftAI building block. This may be repeated for one or more SoftAI building blocks. FIG. 13 illustrates an embodiment spectrum adapted for intelligent spectrum utilization. In this example, the SoftAI configuration module interacts with radio resource management function to configure appropriate building blocks (e.g., waveforms, frame structures, etc.) as different parts of the spectrum are used during different times. FIG. 14 illustrates another embodiment spectrum adapted for intelligent spectrum utilization. In this example, the SoftAI configuration module is content-aware and configures the appropriate building blocks (e.g., multiple access mechanisms, frame structures, etc.) dynamically based on what type of traffic is being communicated.

Figure 15:
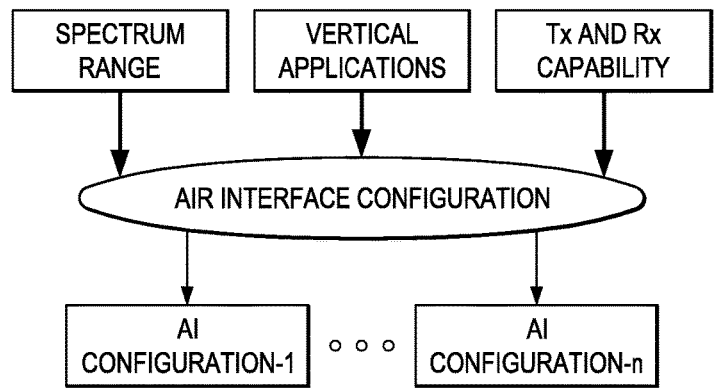
FIG. 15 illustrates a diagram of an embodiment static/semi-static AI adaptation scheme.

FIG. 15 illustrates a static/semi-static AI adaptation scheme. Some AI build blocks can be configured statically or semi-statically. Based on the operating spectrum range, SoftAI adaptation may include waveform (WF) selection, frame structure selection, etc. This adaptation can be semi-static. Based on the transmit node capability, low cost transmit nodes and devices may only be able to support a subset of AI configurations and/or candidates in a building block. This may be a static adaptation. For example, the low cost device may support only a waveform with low (peak-to-average power ratio) PAPR. For vertical application scenario, it may include pre-defined customized AI. Multiple AI configurations can co-exist in the same network.

Figure 16:
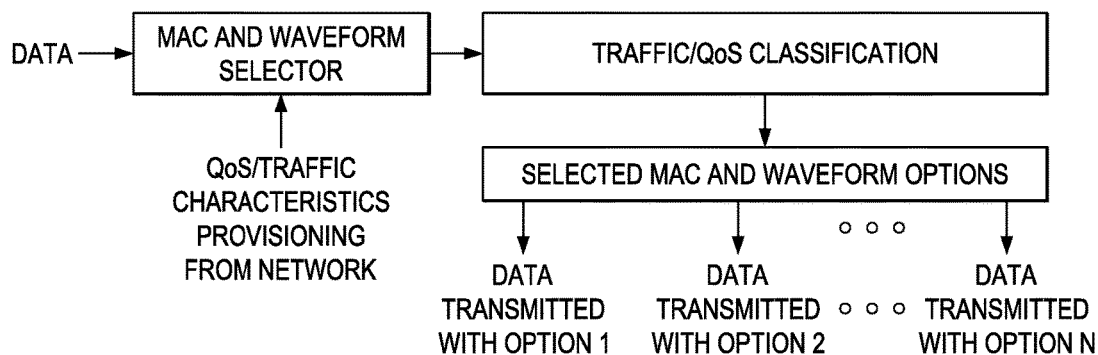
FIG. 16 illustrates a diagram of an embodiment dynamic AI adaptation scheme.

FIG. 16 illustrates a dynamic AI Adaptation scheme for content-aware AI adaptation. A medium access control (MAC) mode and waveform selector is provided with a set of QoS/traffic characteristics and their corresponding MAC modes and waveforms by the network. MAC modes may include contention access, scheduled access, etc. Waveforms may include orthogonal frequency division multiple access (OFDMA), sparse code multiple access (SCMA), etc. The MAC mode and waveform selector determines how to transmit data with different characteristics based on QoS/traffic types. A traffic/QoS classification module determines the appropriate MAC and waveform for transmitting outgoing data packets. Packets are then transmitted using multiple MAC modes and waveforms simultaneously.

Figure 17:
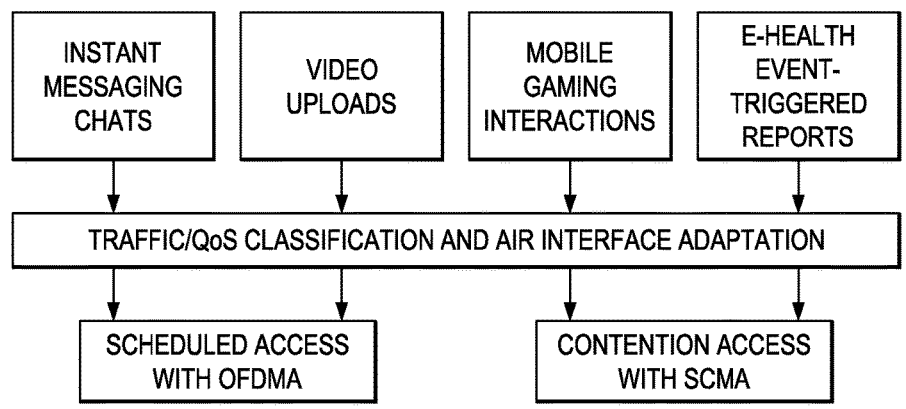
FIG. 17 illustrates a diagram of another embodiment dynamic AI adaptation scheme.

FIG. 17 illustrates another dynamic AI Adaptation scheme for content-aware AI adaptation. Contention access with SCMA can be suitable for bursty traffic of small packets, low latency, and, for example, real-time interactions in mobile gaming, remote health monitoring and diagnosis.

Figure 18:
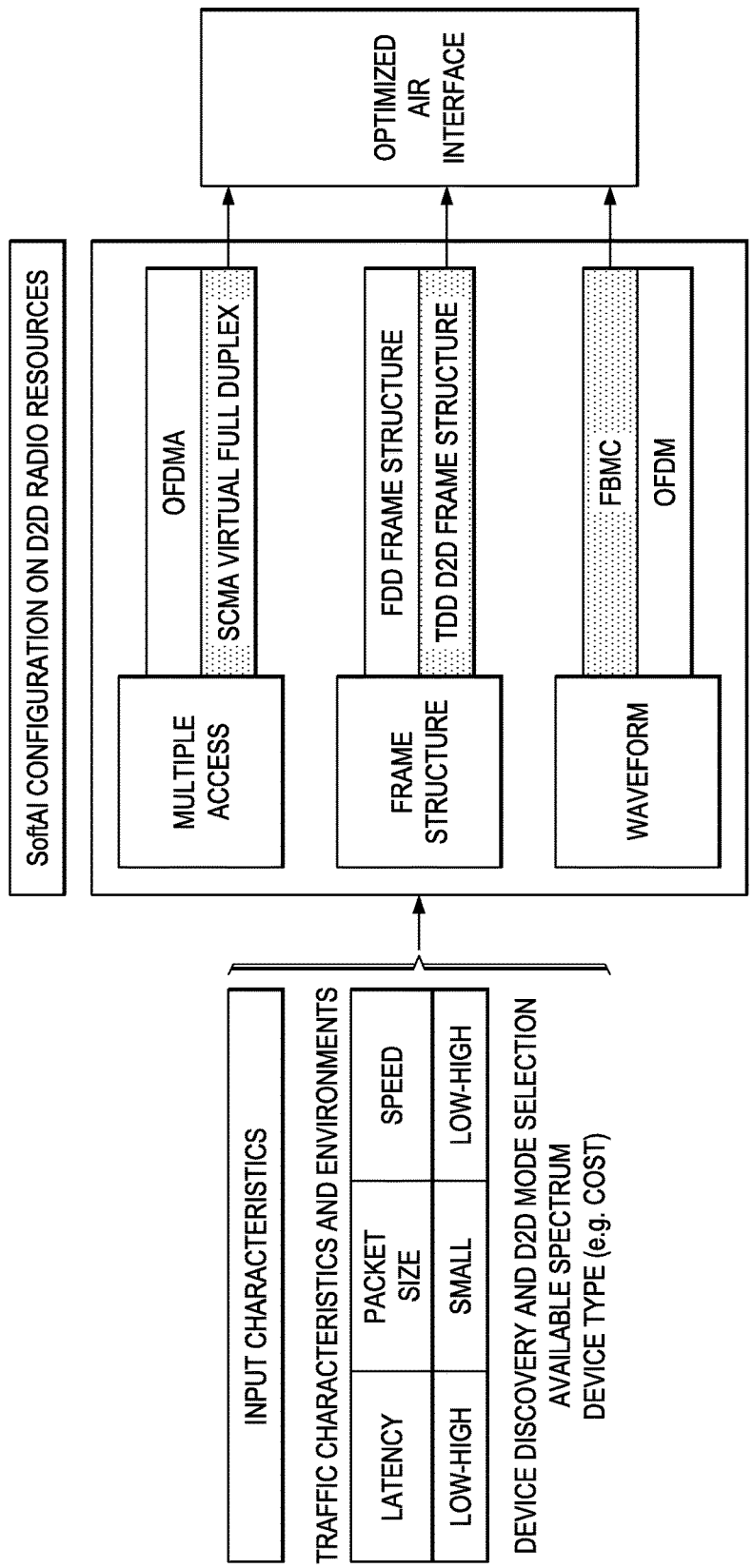
FIG. 18 illustrates a diagram of yet another embodiment dynamic AI adaptation scheme.

FIG. 18 illustrates an embodiment SoftAI adaptation scheme for device-to-device (D2D) communications. Based on traffic characteristics and environments of a D2D scenario, SoftAI selects the best components to optimize the air interface. An embodiment SoftAI update and adaptation mechanism provides flexibility to improve user experience in different application and/or deployment scenarios. An embodiment SoftAI supports efficient downlink (DL) data reception while in a terminal energy-saving state. Embodiments can be utilized in future 3GPP releases, and may be implemented in wireless networks and devices such as mobile terminals, infrastructure equipment, and the like.

Aspects of this disclosure provide a method for updating a SoftAI profile by a base station. The updated SoftAI profile defines a new air interface configuration that was unknown to the base station prior to updating the SoftAI profile. In an embodiment, updating the SoftAI profile includes receiving a SoftAI configuration information from a network controller, and updating the SoftAI profile based on the SoftAI configuration information. In such an embodiment, the new air interface configuration may have been unknown to the base station prior to receiving the SoftAI configuration information. The SoftAI configuration information may be an index, a table, or an instruction.

In one example, the updated SoftAI profile defines one or more orthogonal frequency division multiplexed based (OFDM-based) waveform parameters, such as a transmission time interval (TTI) length, a cyclic-prefix (CP) length, a sub-carrier spacing, and/or a symbol duration of an OFDM-based waveform. In another example, the updated SoftAI profile defines a new combination of physical layer parameters that were unknown to the base station prior to receiving the SoftAI configuration information from the network controller. In such an example, each of the individual physical layer parameters in the new combination of physical layer parameters may have been known by the base station prior to receiving the SoftAI configuration information from the network controller, while the base station may have been unaware that the individual physical layer parameters could be combined in the manner defined by the updated SoftAI profile prior to receiving the SoftAI configuration information from the network controller. Alternatively, the updated SoftAI profile may define at least one new physical layer parameter that was unknown by the base station prior to receiving the SoftAI configuration information from the network controller.

In yet another example, the updated SoftAI profile defines a new waveform that was unknown to the base station prior to receiving SoftAI configuration information from the network controller. In yet another example, the updated SoftAI profile defines a new frame structure that was unknown to the base station prior to receiving SoftAI configuration information from the network controller. In yet another example, the updated SoftAI profile defines a new modulation coding scheme (MCS) that was unknown to the base station prior to receiving SoftAI configuration information from the network controller.

In yet another example, the updated SoftAI profile defines a new re-transmission protocol that was unknown to the base station prior to receiving SoftAI configuration information from the network controller. In yet another example, the updated SoftAI profile defines a new forward error correction (FEC) protocol that was unknown to the base station prior to receiving SoftAI configuration information from the network controller. In yet another example, the updated SoftAI profile defines a new multiple access scheme that was unknown to the base station prior to receiving SoftAI configuration information from the network controller.

In one embodiment, the method further includes communicating a traffic flow to a wireless device in accordance with the new air interface configuration after updating the SoftAI profile. In one example, the SoftAI configuration information, or a separate instruction, instructs the base station to communicate the traffic flow in accordance with the new air interface configuration when a characteristic of the traffic flow satisfies a criteria. In such an example, the SoftAI configuration information, or a separate instruction, may instruct the base station to communicate the traffic flow in accordance with the new air interface configuration when a quality of service (QoS) requirement of the traffic flow satisfies the criteria, when a packet size associated with the traffic flow satisfies the criteria, or when an amount of data in the traffic flow satisfies the criteria. In yet another example, the SoftAI configuration information, or a separate instruction, instructs the base station to communicate the traffic flow in accordance with the new air interface configuration when a characteristic of a wireless link between the base station and the wireless device satisfies a criteria. In such an example, the SoftAI configuration information, or a separate instruction, may instruct the base station to communicate the traffic flow in accordance with the new air interface configuration when a path loss or error rate over the wireless link satisfies the criteria. In yet another example, the SoftAI configuration information, or a separate instruction, instructs the base station to communicate the traffic flow in accordance with the new air interface configuration when a characteristic of the wireless device satisfies a criteria. In such an example, the SoftAI configuration information, or a separate instruction, may instruct the base station to communicate the traffic flow in accordance with the new air interface configuration when a mobility speed of the wireless device satisfies the criteria.

The SoftAI configuration information may define the updated SoftAI profile in its entirety. Alternatively, the SoftAI configuration information may modify one or more entries in an existing SoftAI profile to form the updated SoftAI profile. The existing SoftAI profile may have been known by the base station prior to receiving the SoftAI configuration information, while the modified entries may have been unknown to the base station prior to receiving the SoftAI configuration information.

Aspects of this disclosure further provide a method for establishing software-configurable air interface (SoftAI) in a network, as may be performed by a base station. The method includes receiving SoftAI configuration information from a network controller. The SoftAI configuration information being used to construct a SoftAI table defining a new air interface configuration that was unknown to the base station prior to receiving the SoftAI configuration information from the network controller. The method further includes communicating a traffic flow to a wireless device in accordance with the new air interface configuration after receiving the SoftAI configuration information from the network controller. In one example, the new interface configuration was a priori information to the wireless device prior to the base station receiving the SoftAI configuration information from the network controller. In another example, the base station forwards the SoftAI configuration information to the wireless device prior to communicating the traffic flow over the wireless link. In such an example, the new air interface configuration may have been unknown to the wireless device prior to receiving the SoftAI configuration information from the base station.

Figure 19:
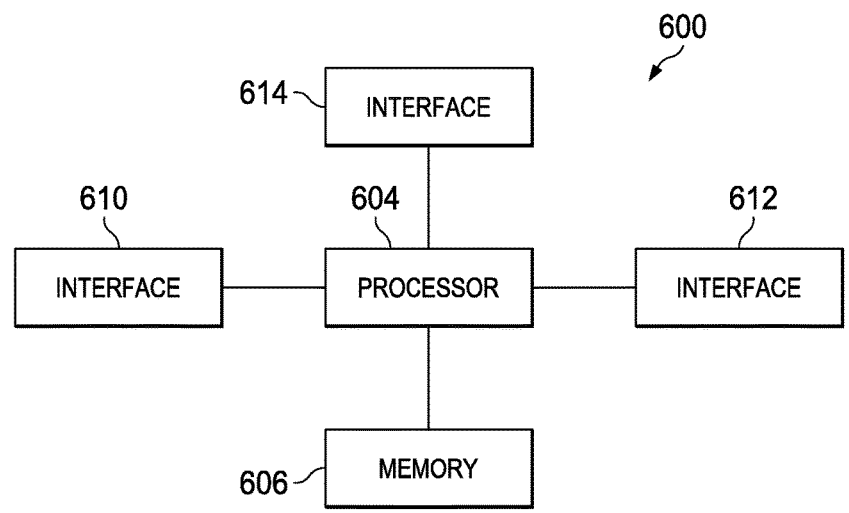
FIG. 19 illustrates a diagram of an embodiment processing system.

FIG. 19 is a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side wireless device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 20:
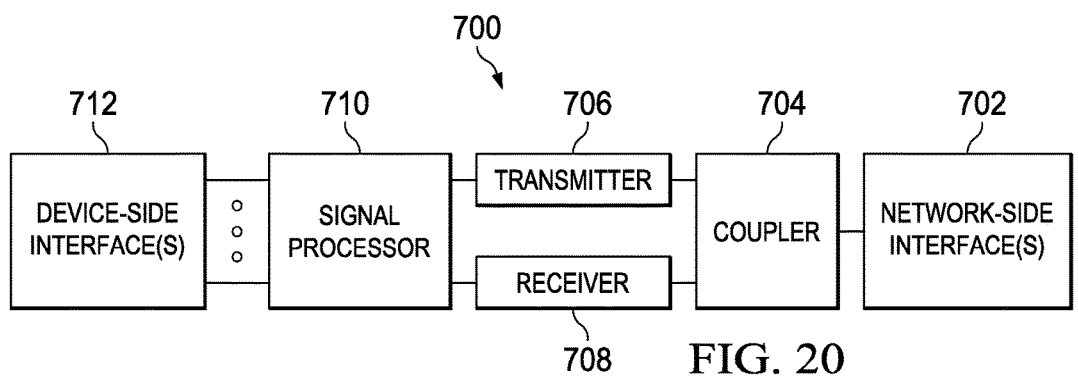
FIG. 20 illustrates a diagram of an embodiment transceiver.

In some embodiments, one or more of the interfaces 1910, 1912, 1914 connects the processing system 1900 to a transceiver adapted to transmit and receive signaling over the telecommunications network. FIG. 20 is a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments

What is claimed is:

1. A method comprising:
    updating, by a base station, a software-configurable air interface (SoftAI) profile, the updated SoftAI profile defining a new air interface configuration comprising a subset of parameters used to configure an air interface that were unknown to the base station prior to receiving SoftAI configuration information from a network controller, wherein two or more parameters of the subset define a new multiple access scheme and at least one of a new waveform, frame structure, modulation coding scheme (MCS), or re-transmission protocol that were unknown to the base station prior to the base station receiving the SoftAI configuration information from the network controller;
    maintaining, by the base station, a SoftAI configurations table comprising an existing air interface configuration and the new air interface configuration, wherein the SoftAI configurations table comprises a predefined mapping between an updated information and a corresponding SoftAI configuration, and wherein the updated information comprises at least one of a configuration number or component numbers;
    transmitting, by the base station to a user equipment (UE), a radio resource control (RRC) signaling comprising at least one of the configuration number or the component numbers to indicate the new air interface configuration; and
    communicating, by the base station, a traffic flow over a wireless link between the base station and the UE in accordance with the new air interface configuration.

2. The method of claim 1, wherein updating the SoftAI profile comprises:
    receiving, by the base station, the SoftAI configuration information from the network controller; and
    updating the SoftAI profile based on the SoftAI configuration information, wherein the new air interface configuration was unknown to the base station prior to receiving the SoftAI configuration information.

3. The method of claim 1, wherein the SoftAI configuration information is an index, a table, or an instruction.

4. The method of claim 1, wherein the updated SoftAI profile defines one or more orthogonal frequency division multiplexed based (OFDM-based) waveform parameters.

5. The method of claim 4, wherein the updated SoftAI profile defines one or more of a transmission time interval (TTI) length, a cyclic-prefix length, a sub-carrier spacing, and a symbol duration, of an OFDM-based waveform.

6. The method of claim 1, wherein the updated SoftAI profile defines a new combination of physical layer parameters that were unknown to the base station prior to receiving the SoftAI configuration information from the network controller.

7. The method of claim 6, wherein each individual physical layer parameters in the new combination of physical layer parameters was known by the base station prior to receiving the SoftAI configuration information from the network controller, and wherein the base station was unaware that the individual physical layer parameters could be combined in a manner defined by the updated SoftAI profile prior to receiving the SoftAI configuration information from the network controller.

8. The method of claim 1, wherein the updated SoftAI profile defines at least one new physical layer parameter that was unknown by the base station prior to receiving the SoftAI configuration information from the network controller.

9. The method of claim 1, wherein the updated SoftAI profile defines the new waveform that was unknown to the base station prior to receiving the SoftAI configuration information from the network controller.

10. The method of claim 1, wherein the updated SoftAI profile defines the new frame structure that was unknown to the base station prior to receiving the SoftAI configuration information from the network controller.

11. The method of claim 1, wherein the updated SoftAI profile defines the new MCS that was unknown to the base station prior to receiving the SoftAI configuration information from the network controller.

12. The method of claim 1, wherein the updated SoftAI profile defines the new re-transmission protocol that was unknown to the base station prior to receiving the SoftAI configuration information from the network controller.

13. The method of claim 1, wherein the updated SoftAI profile further defines a new forward error correction (FEC)

protocol that was unknown to the base station prior to receiving the SoftAI configuration information from the network controller.

14. The method of claim 1, wherein the SoftAI configuration information, or a separate instruction, received from the network controller instructs the base station to communicate the traffic flow in accordance with the new air interface configuration when a characteristic of the traffic flow satisfies a criteria.

15. The method of claim 14, wherein the SoftAI configuration information, or the separate instruction, instructs the base station to communicate the traffic flow in accordance with the new air interface configuration when a quality of service (QoS) requirement of the traffic flow satisfies the criteria.

16. The method of claim 14, wherein the SoftAI configuration information, or the separate instruction, instructs the base station to communicate the traffic flow in accordance with the new air interface configuration when a packet size associated with the traffic flow satisfies the criteria.

17. The method of claim 14, wherein the SoftAI configuration information, or the separate instruction, instructs the base station to communicate the traffic flow in accordance with the new air interface configuration when an amount of data in the traffic flow satisfies the criteria.

18. The method of claim 1, wherein the SoftAI configuration information, or a separate instruction, received from the network controller instructs the base station to communicate the traffic flow in accordance with the new air interface configuration when a characteristic of the wireless link between the base station and the UE satisfies a criteria.

19. The method of claim 18, wherein the SoftAI configuration information, or the separate instruction, instructs the base station to communicate the traffic flow in accordance with the new air interface configuration when a path loss or error rate over the wireless link satisfies the criteria.

20. The method of claim 1, wherein the SoftAI configuration information, or a separate instruction, received from the network controller instructs the base station to communicate the traffic flow in accordance with the new air interface configuration when a characteristic of the UE satisfies a criteria.

21. The method of claim 20, wherein the SoftAI configuration information, or the separate instruction, instructs the base station to communicate the traffic flow in accordance with the new air interface configuration when a mobility speed of the UE satisfies the criteria.

22. The method of claim 1, wherein the SoftAI configuration information received from the network controller defines the updated SoftAI profile in its entirety.

23. The method of claim 1, wherein the SoftAI configuration information received from the network controller modifies one or more entries in an existing SoftAI profile to form the updated SoftAI profile, the existing SoftAI profile being known by the base station prior to receiving the SoftAI configuration information, the modified one or more entries being unknown to the base station prior to receiving the SoftAI configuration information.

24. A base station comprising:
a processor; and
a non-transitory computer readable storage medium storing programming for execution by the processor, the programming including instructions to:
update a software-configurable air interface (SoftAI) profile, the updated SoftAI profile defining a new air interface configuration comprising a subset of parameters used to configure an air interface that were unknown to the base station prior to receiving SoftAI configuration information from a network controller, wherein two or more parameters of the subset define a new multiple access scheme and at least one of a new waveform, frame structure, modulation coding scheme (MCS), or re-transmission protocol that were unknown to the base station prior to the base station receiving the SoftAI configuration information from the network controller;
maintain a SoftAI configurations table comprising an existing air interface configuration and the new air interface configuration, wherein the SoftAI configurations table comprises a predefined mapping between an updated information and a corresponding SoftAI configuration, and wherein the updated information comprises at least one of a configuration number or component numbers;
transmit, to a user equipment (UE), a radio resource control (RRC) signaling comprising at least one of the configuration number or the component numbers to indicate the new air interface configuration; and
communicate a traffic flow over a wireless link between the base station and the UE in accordance with the new air interface configuration.

25. A method for establishing software-configurable air interface (SoftAI) in a network, the method comprising:
receiving, by a base station, SoftAI configuration information from a network controller, the SoftAI configuration information being used to construct a SoftAI table defining a new air interface configuration used to configure an air interface, wherein the new air interface configuration defined by the SoftAI table comprises a subset of parameters that were unknown to the base station prior to receiving the SoftAI configuration information from the network controller, and wherein two or more parameters of the subset define a new multiple access scheme and at least one of a new waveform, frame structure, modulation coding scheme (MCS), or re-transmission protocol that was unknown to the base station prior to the base station receiving the SoftAI configuration information from the network controller;
maintaining, by the base station, a SoftAI configurations table comprising an existing air interface configuration and the new air interface configuration, wherein the SoftAI configurations table comprises a predefined mapping between an updated information and a corresponding SoftAI configuration, and wherein the updated information comprises at least one of a configuration number or component numbers;
transmitting, by the base station to a user equipment (UE), a radio resource control (RRC) signaling comprising at least one of the configuration number or the component numbers to indicate the new air interface configuration; and
communicating, by the base station, a traffic flow over a wireless link between the base station and a wireless device in accordance with the new air interface configuration after receiving the SoftAI configuration information from the network controller.

26. The method of claim 25, wherein the new air interface configuration was a priori information to the wireless device prior to the base station receiving the SoftAI configuration information from the network controller.

27. The method of claim 25, further comprising:
forwarding the SoftAI configuration information to the wireless device prior to communicating the traffic flow over the wireless link, wherein the new air interface configuration was unknown to the wireless device prior to receiving the SoftAI configuration information from the base station.

28. A method comprising:
receiving, by a user equipment (UE) from a base station, a radio resource control (RRC) signaling comprising at least one of a configuration number or component numbers to indicate a new air interface configuration comprising a subset of parameters used to configure an air interface that were unknown to the UE prior to receiving the new air interface configuration from the base station, wherein two or more parameters of the subset define a new multiple access scheme and at least one of a new waveform, frame structure, modulation coding scheme (MCS), or re-transmission protocol that was unknown to the UE prior to receiving the RRC signaling from the base station,
wherein the base station maintains a SoftAI configurations table comprising an existing air interface configuration and the new air interface configuration, wherein the SoftAI configurations table comprises a predefined mapping between an updated information and a corresponding SoftAI configuration, and wherein the updated information comprises at least one of the configuration number or the component numbers; and
communicating, by the UE, a traffic flow over a wireless link between the UE and the base station in accordance with the new air interface configuration.

29. The method of claim 28, wherein the new air interface configuration defines the new waveform.

30. The method of claim 28, wherein the new air interface configuration defines the new frame structure.

31. The method of claim 28, wherein the new air interface configuration defines the new MCS.

32. The method of claim 28, wherein the new air interface configuration defines the new re-transmission protocol.

33. A user equipment (UE) comprising:
a processor; and
a non-transitory computer readable storage medium storing programming for execution by the processor, the programming including instructions to:
receive, from a base station, a radio resource control (RRC) signaling comprising at least one of a configuration number or component numbers to indicate a new air interface configuration comprising a subset of parameters used to configure an air interface that were unknown to the UE prior to receiving the new air interface configuration from the base station, wherein two or more parameters of the subset define a new multiple access scheme and at least one of a new waveform, frame structure, modulation coding scheme (MCS), or re-transmission protocol that was unknown to the UE prior to receiving the RRC signaling from the base station,
wherein the base station maintains a SoftAI configurations table comprising an existing air interface configuration and the new air interface configuration, wherein the SoftAI configurations table comprises a predefined mapping between an updated information and a corresponding SoftAI configuration, and wherein the updated information comprises at least one of the configuration number or the component numbers; and
communicate a traffic flow over a wireless link between the UE and the base station in accordance with the new air interface configuration.

34. The UE of claim 33, wherein the new air interface configuration defines the new waveform.

35. The UE of claim 33, wherein the new air interface configuration defines the new frame structure.

36. The UE of claim 33, wherein the new air interface configuration defines the new MCS.

37. The UE of claim 33, wherein the new air interface configuration defines the new re-transmission protocol.

38. The method of claim 1, wherein the new multiple access scheme is one of a grant-free multiple access scheme, or a scheduling based multiple access scheme.

* * * * *